US012590807B2

(12) United States Patent
Fukunaga

(10) Patent No.: US 12,590,807 B2
(45) Date of Patent: Mar. 31, 2026

(54) INFORMATION PROCESSING APPARATUS AND INFORMATION PROCESSING METHOD

(71) Applicant: SONY GROUP CORPORATION, Tokyo (JP)

(72) Inventor: Daisuke Fukunaga, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 55 days.

(21) Appl. No.: 18/697,488

(22) PCT Filed: Oct. 3, 2022

(86) PCT No.: PCT/JP2022/036995
§ 371 (c)(1),
(2) Date: Apr. 1, 2024

(87) PCT Pub. No.: WO2023/063149
PCT Pub. Date: Apr. 20, 2023

(65) Prior Publication Data
US 2025/0012581 A1 Jan. 9, 2025

(30) Foreign Application Priority Data
Oct. 12, 2021 (JP) ................................. 2021-167514

(51) Int. Cl.
*G01C 21/34* (2006.01)
(52) U.S. Cl.
CPC ..... *G01C 21/3461* (2013.01); *G01C 21/3492* (2013.01)

(58) Field of Classification Search
CPC ... G01C 21/3461; G01C 21/3492; G05D 1/02
See application file for complete search history.

(56) References Cited

U.S. PATENT DOCUMENTS 5,625,559 A * 4/1997 Egawa ................. G05D 1/0274
701/117
11,079,245 B1 * 8/2021 Niewiadomski ... G01C 21/3492

FOREIGN PATENT DOCUMENTS

| CN | _109115226 | * | 1/2019 | ............ | G01C 21/20 |
| JP | 10-312217 A | | 11/1998 | | |
| JP | 10-320047 A | | 12/1998 | | |
| JP | 2020-008962 A | | 1/2020 | | |
| JP | 2020-009405 A | | 1/2020 | | |

(Continued)

OTHER PUBLICATIONS

International Search Report and Written Opinion of PCT Application No. PCT/JP2022/036995, issued on Nov. 8, 2022, 10 pages of ISRWO.

(Continued)

*Primary Examiner* — Jonathan Malikasim
(74) *Attorney, Agent, or Firm* — CHIP LAW GROUP

(57) ABSTRACT

Provided is an information processing apparatus includes a graph structure generation unit and a route planning unit. The graph structure generation unit sets an area including a plurality of graph elements in a graph including a node and an edge as a graph element. The route planning unit plans a route of a plurality of moving bodies (MB) in a graph such that a conflict of moving bodies (MB) exceeding the capacity of the area does not occur in the area.

9 Claims, 19 Drawing Sheets

(56) References Cited

FOREIGN PATENT DOCUMENTS

| | | | |
|----|----------------|----|--------|
| JP | 2021-071795 A  | | 5/2021 |
| JP | 2021-071891 A  | | 5/2021 |
| JP | 2022-047944 A  | | 3/2022 |
| WO | 2020/132386 A1 | | 6/2020 |

OTHER PUBLICATIONS

Sharon, et al., "Conflict-Based Search for Optimal Multi-Agent Pathfinding", Proceedings of the Twenty-Sixth AAAI Conference on Artificial Intelligence, vol. 219, Feb. 2015, 7 pages.

* cited by examiner

EXAMPLE OF ROUTE PLANNING

ROBOT 1
A→B(0, 3)
B→C(3, 6)
C→D(6, 10)

TRAVELING ALONG EDGE: [START NODE]→
[GOAL NODE]([DEPARTURE TIME], [ARRIVAL TIME])
or
WAITING AT NODE: [WAITING NODE]([START TIME, END TIME]).

ROBOT 2
D(0, 3)
D→B(3, 5)
B→E(5, 8)

*TO WAIT FOR ANOTHER ROBOT, ROBOT MAY WAIT AT NODE
WITHOUT MOVING.

FIG.3

EXAMPLE OF ROUTE PLANNING

ROBOT 1
A→B(0, 3)
B→C(3, 6)
C→D(6, 10)

CONFLICT OCCURS AT
EDGE B→C
AT TIME (5, 6)

ROBOT 2
D(0, 3)
D→B(3, 5)
B→C(5, 8)

EXAMPLE OF GRAPH DATA STRUCTURE

```
nodes:                  edges:                  areas:
  - id: 0                 - id: 0                 - id: 0
    position:              src_node_id: 0          capacity: 1
      x: 0.0               dst_node_id: 1          node_ids: [0, 1]
      y: 2.0               length: 2.0             edge_ids: [0]
      z: 0.0               area_ids: [0, 1]      - id: 1
    area_ids: [0, 1]     - id: 1                   capacity: 2
  - id: 1                  src_node_id: 1          node_ids: [1]
    position:              dst_node_id: 2          edge_ids: [0, 1]
      x: 1.0               length: 3.0               .
      y: 3.0               area_ids: [1, 2]          .
      z: 0.0                 .
    area_ids: [1]           .
      .                     .
      .
      .
```

```
ROUTE                   AFTER AREA
PLANNING                CONVERSION

ROBOT 1                 ROBOT 1
A→B(0, 4)               AREA 1(4, 7)
B(4, 5)
B→C(5, 7)                                    CONFLICT OCCURS AT AREA 1
C→D(7, 10)                                        AT TIME (4, 5)

ROBOT 2                 ROBOT 2
E→B(0, 3)               AREA 1(3, 5)       *NODE B, NODE C, AND EDGE B→C
B→C(3, 5)                                      BELONG TO SAME AREA 1.
C→F(5, 9)                                    ALSO, Capacity OF AREA 1 IS 1
```

STAY TIME IN AREA 1

WHEN CAPACITY OF AREA 1 IS 2, CONFLICT OCCURS AT TIME (4, 6)

MP

AR-1

AREA 1

AR-2

AREA 2

A

B

C

D

H

ND     ND     ND     ND     ND

ROUTE
PLANNING

AFTER AREA
CONVERSION

ROBOT 1
A→B(0, 2)
B→C(2, 4)
C(4, 5)
C→D(5, 7)
D→E(7, 9)

ROBOT 1
AREA 1(2, 5)
AREA 2(4, 7)

INFORMATION PROCESSING APPARATUS AND INFORMATION PROCESSING METHOD

CROSS REFERENCE TO RELATED APPLICATIONS

This application is a U.S. National Phase of International Patent Application No. PCT/JP2022/036995 filed on Oct. 3, 2022, which claims priority benefit of Japanese Patent Application No. JP 2021-167514 filed in the Japan Patent Office on Oct. 12, 2021. Each of the above-referenced applications is hereby incorporated herein by reference in its entirety.

FIELD

The present invention relates to an information processing apparatus, an information processing method, and a program.

BACKGROUND

One of important functions of the autonomous moving body is route planning. Route planning is to calculate a route along which the moving body should move to a goal point using a map of a surrounding environment. Calculating routes of a plurality of moving bodies simultaneously is referred to as multiple moving body route planning. In the case of the multiple moving body route planning, it is necessary to search for a route along which a moving body does not conflict with other moving bodies. Therefore, calculation becomes significantly more complicated than route planning of a single moving body. The conflict means that the moving body cannot reach the goal due to collision or deadlock between the moving bodies.

CITATION LIST

Patent Literature

Patent Literature 1: JP H10-320047 A
Patent Literature 2: JP 2021-071891 A

SUMMARY

Technical Problem

The multiple moving body route planning is performed on a graph having a node and an edge as a graph element. The graph is a topological map representing an environment in which the moving body moves. The graph is created based on the arrangement of obstacles in the environment and the like. Conventional conflict detection is performed for each graph element. However, in an environment in which a system using a plurality of moving bodies is actually operated, there is a case where it is desired to perform conflict detection across a plurality of graph elements.

Therefore, the present disclosure proposes an information processing apparatus, an information processing method, and a program capable of detecting a conflict across the plurality of graph elements.

Solution to Problem

According to the present disclosure, an information processing apparatus is provided that comprises: a graph structure generation unit that sets an area including a plurality of graph elements in a graph including a node and an edge as a graph element; and a route planning unit that plans routes of a plurality of moving bodies in the graph such that a conflict of the moving bodies exceeding a capacity of the area does not occur in the area. According to the present disclosure, an information processing method in which an information process of the information processing apparatus is executed by a computer, and a program for causing a compute to execute the information process of the information processing apparatus are provided.

BRIEF DESCRIPTION OF DRAWINGS

FIG. 3 is a diagram illustrating an example of route planning.

DESCRIPTION OF EMBODIMENTS

Figures 1, 2:
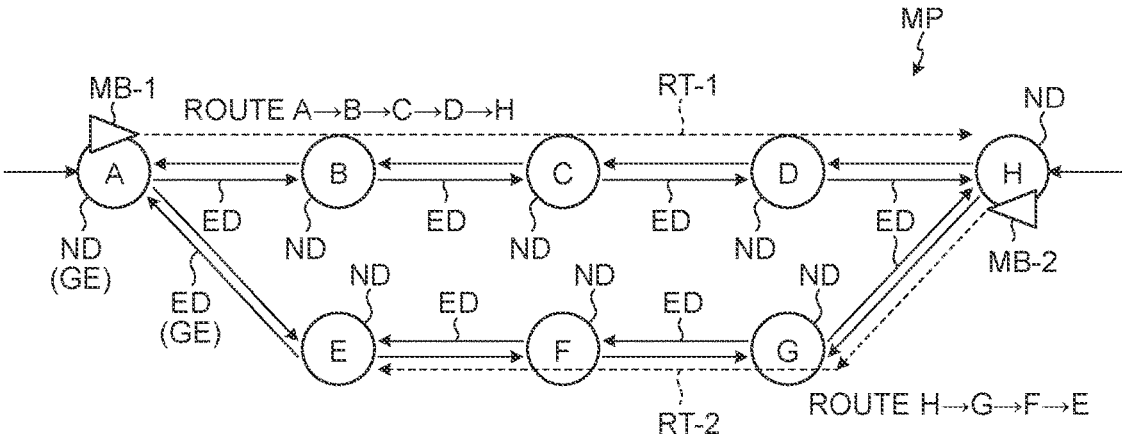
FIG. 1 is a diagram illustrating an example of a graph used in route planning.
FIG. 2 is a diagram illustrating an example of route planning.

Hereinafter, embodiments of the present disclosure will be described in detail with reference to the drawings. In the following embodiments, the same parts are denoted by the same reference numerals so that redundant description can be omitted.

The description will be given in the following order.

[1. Prior art]

[1-1. Graph structure]
[1-2. Example of route planning]
[1-3. Route search method]
[1-4. Problems of the prior art]

[2. Outline of a route search method of the present disclosure]

[3. Configuration of the information processing apparatus]

[4. Conflict detection/route planning]

[5. Specific example of area setting]

[6. Parent and child area setting]

[7. Specific example of parent and child area setting]

[7-1. Setting of a turn prohibition zone]
[7-2. Control of the number of robots entering an edge]

[8. User interface]

[9. Application example of a route search method of the present disclosure]

[10. Example of a hardware configuration]

[11. Effects]

1. Prior Art

1-1. Graph Structure

FIG. 1 is a diagram illustrating an example of a graph MP used in route planning of a moving body. Hereinafter, an example in which the moving body is an autonomous mobile robot MB will be described. In all the following drawings, the same configurations are denoted by the same reference numerals. In the case of distinguishing configurations of the same type, a number or a symbol is added after the reference numeral.

Route planning is one of basic problems for the autonomous mobile robot MB. To efficiently obtain the shortest route, the graph MP as illustrated in FIG. 1 is used. The graph MP includes a node ND and an edge ED as a graph element GE. The graph MP is a topological map representing an environment in which the robot MB moves. The graph MP is created based on the arrangement of an obstacle in the environment and the like. The graph MP may be an undirected graph or a directed graph (in which one-way traffic can be represented). FIG. 1 illustrates an example of the directed graph.

1-2. Example of Route Planning

Figure 3:
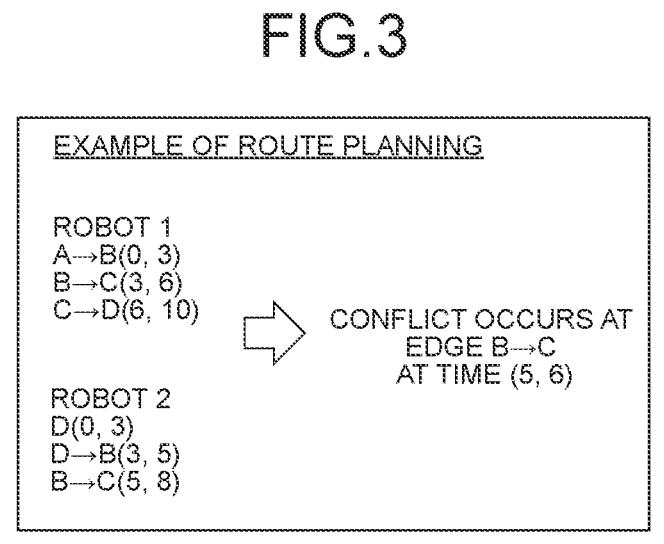

FIGS. 2 and 3 are diagrams illustrating an example of route planning.

Route planning is represented by, for example, a series of the nodes ND and edges ED through which the robot MB passes and times at which the robot MB passes through the nodes ND and edges ED. In the case of traveling along the edge ED, route planning is represented by the time at which the robot MB departs from the node ND at one end of the edge ED and the time at which the robot MB arrives at the other node ND. In the case of waiting at the node ND, route planning is represented by the start time and the end time of the waiting. The arrangement of the traveling time along the edge ED from the start point (node ND) to the goal point (node ND) and the waiting time at the node ND forms route planning.

When a plurality of different robots MB wait at the same node ND or travel along the same edge ED at the same time, it is considered that such a route RT is in a conflict (also referred to as interference). In multiple robot route planning, a set of routes RT without a conflict is required. The set of routes RT without a conflict is obtained by, for example, a graph search algorithm such as A* (A-star) or Conflict-Based Search (CBS). CBS is described in the following document [1].

[1] G. Sharon, et al., "Conflict-Based Search for Optimal Multi-Agent Pathfinding" Artificial Intelligence, Vol. 219, pp. 40-66 (2015)

Most multiple robot route planning algorithms have processing of checking for a conflict in the route RT. In checking for a conflict in the route RT, it is checked whether there is an overlap of the time at which each robot MB waits at the node ND or the time at which each robot MB travels along the edge ED for all the nodes ND and the edges ED in the graph MP. If there is at least one time overlap, the set of routes RT is considered to be in a conflict, and another set of routes RT is searched for.

1-3. Route Search Method

Figures 4A, 4B:
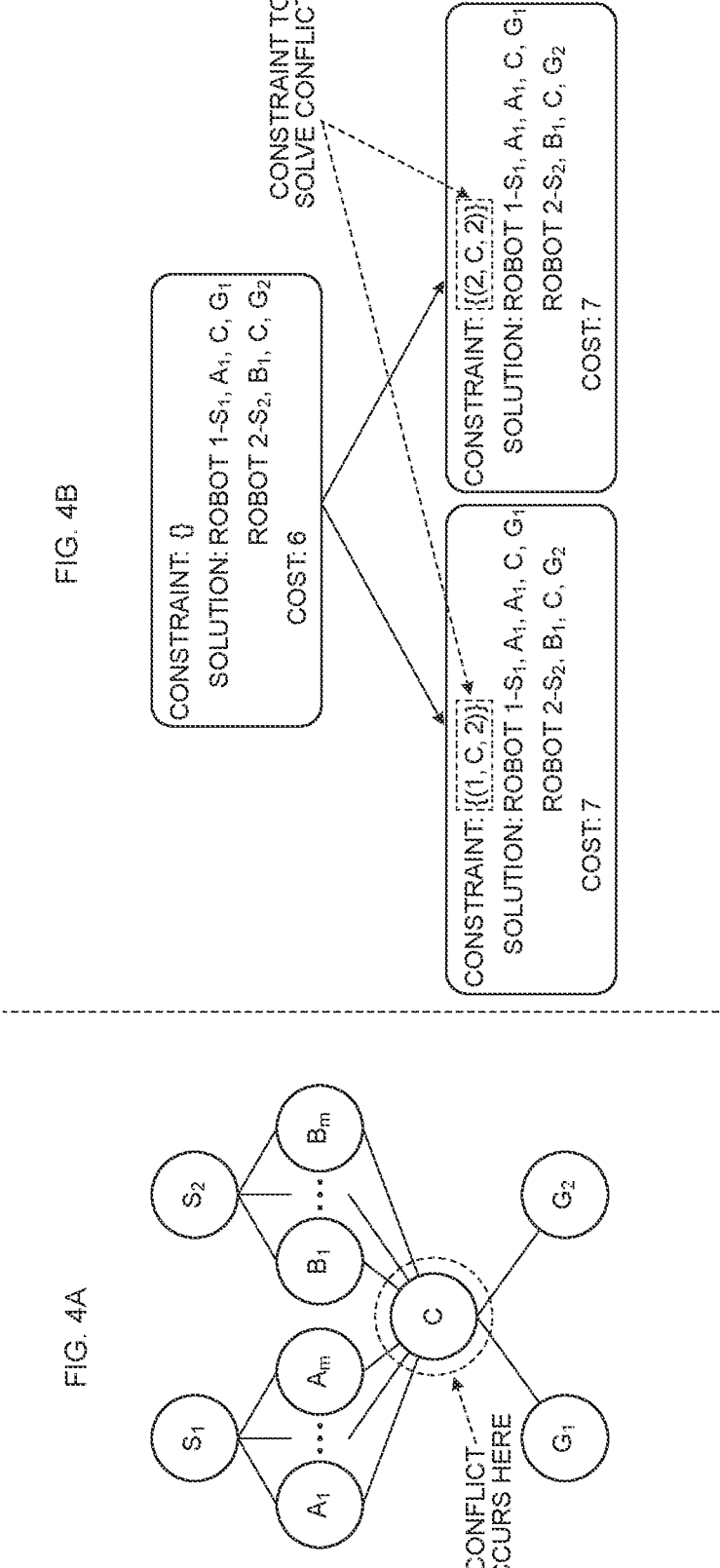
FIGS. 4A and 4B are explanatory diagrams of a route search method using CBS.

FIGS. 4A and 4B are explanatory diagrams of a route search method using CBS.

The CBS is an algorithm that starts from the shortest route of each robot MB (not considering the presence of other robots MB), solves conflicts between the robots MB one by one, and finally obtains an optimum solution without a conflict (=a set of route planning with which all the robots MB can reach the goal fastest). The optimum solution is realized by expanding a binary tree called a constraint tree CT and searching for a solution.

Consider as an example a graph MP including vertexes $S_1$, $S_2$, $A_1$, . . . , $A_m$, $B_1$, . . . , $B_m$, C, $G_1$, and $G_2$ illustrated in FIG. 4A on the left. The vertex $S_1$ and the vertex $S_2$ are the nodes ND of the start points of the robot MB-1 and the robot MB-2, respectively, and the vertex $G_1$ and the vertex $G_2$ are the nodes ND of the goal points of the robot MB-1 and the robot MB-2, respectively. The robot MB travels along one edge ED at each time step. At this time, the constraint tree CT is expanded as illustrated in FIG. 4B.

Each node ND of the constraint tree CT includes (1) a set of constraints (Con in the diagram), (2) a set of route planning of each robot MB (Sol in the diagram), and (3) a total cost (Cost in the diagram) (the cost is the number of steps required for the robot MB to reach the goal).

First, the root node (the node ND located at the top of the constraint tree CT) is the shortest route of each robot MB without a constraint. Therefore, the route RT-1 of the robot MB-1 is $S_1 \to A_1 \to C \to G_1$, and the route RT-2 of the robot MB-2 is $S_2 \to B_1 \to C \to G_2$. Here, the robot MB-1 and the robot MB-2 conflict at the vertex C in the second step. Therefore, a child node adding a constraint such that the robot MB does not reach the vertex C in the second step is generated. At this time, two child nodes are formed with a constraint on the robot MB-1 and a constraint on the robot MB-2.

The constraint is represented by (1) the target robot MB, (2) the vertex the robot MB cannot reach, and (3) the number of steps for the vertex. "Con: {(1, C, 2)}" in the drawing represents the constraint that the robot MB-1 must not reach the vertex C in the second step. In the child node, the shortest route of each robot MB is recalculated based on the constraint.

For example, in the child node on the left in the diagram, the robot MB-1 waits for one step at the vertex $A_1$ ($S_1 \to A_1 \to A_1 \to C \to G_1$) due to the constraint. In this way, the above-described conflict can be solved. Since one step increases due to the waiting, the total cost increases by one from the parent node. By repeatedly performing this operation, a combination of routes RT without a conflict is finally found. In addition, by expanding from the node ND having the smallest total cost, the first found combination of the routes RT without a conflict is defined as the optimal solution (=the solution having the smallest cost).

Figure 5:
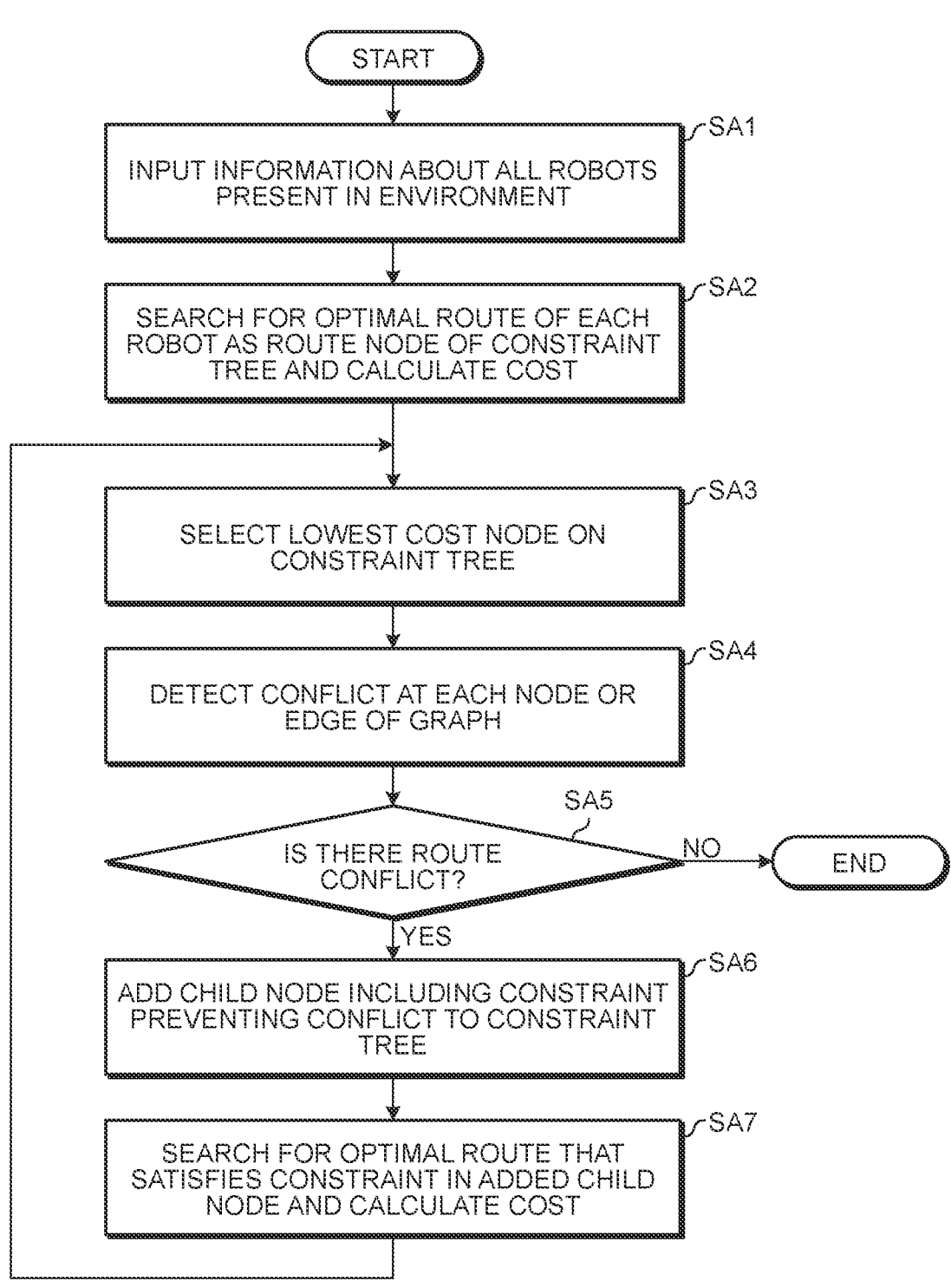
FIG. 5 is a flowchart of route search.

FIG. 5 is a flowchart of route search.

First, a user inputs information on all the robots MB present in the environment (Step SA1). The search system searches for the optimal route of each robot MB as the root node of the constraint tree CT, and calculates the cost (Step SA2). The search system selects the node ND with the lowest cost on the constraint tree CT (Step SA3). The search system detects a conflict at each node ND and each edge ED of the graph MP (Step SA4).

The search system determines whether there is a conflict on the routes of the two robots MB (Step SA5). If it is determined that there is a conflict (Step SA5: Yes), the search system adds a child node including a constraint preventing the conflict to the constraint tree CT (Step SA6). Then, the search system searches for an optimal route that satisfies the constraint in the added child node, and calculates a cost (Step SA7). Thereafter, the processing returns to Step SA3 to repeat the above steps. If it is determined in Step SA5 that there is no conflict (Step SA5: No), the search system recognizes the route of each robot MB as the optimal solution, and ends the processing.

1-4. Problems of the Prior Art

Figure 6:
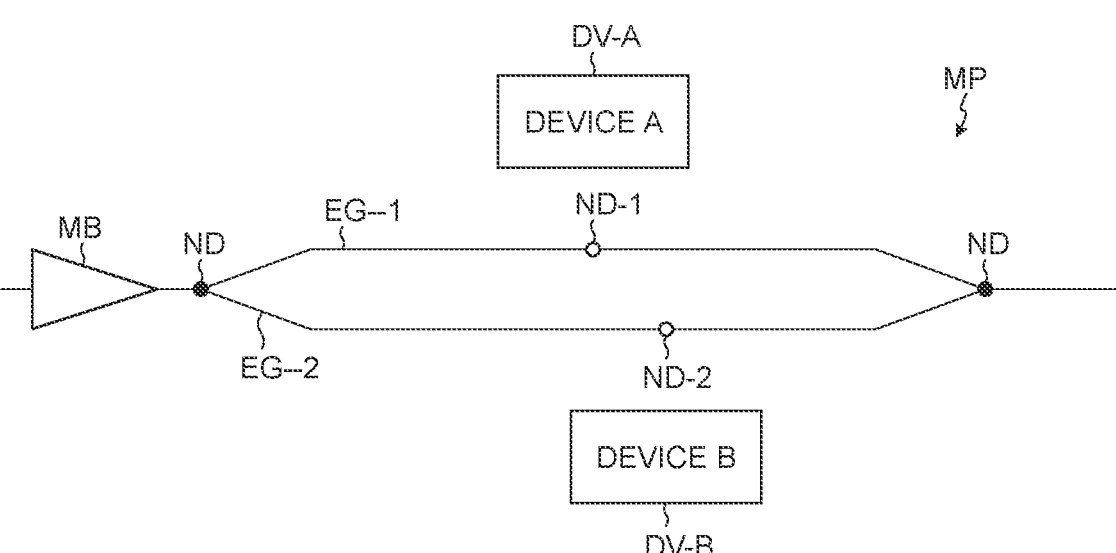
FIG. 6 is a diagram explaining a problem of the prior art.

FIG. 6 is a diagram explaining a problem of the prior art.

As described above, conflict detection in a conventional multiple robot route planning algorithm is performed in units of graph elements GE (in units of nodes ND and edges ED). However, in an environment in which a system using a plurality of robots MB is actually operated, there is a case where it is desired to perform conflict detection across a plurality of nodes ND and edges ED. FIG. 6 is an example of this case.

In the example of FIG. 6, some task (such as picking up an article) is performed in front of a device DV-A and a device DV-B. To stop the robot in front of the device DV, the node ND is arranged in front of each of the devices DV. However, since the distance between the device DV-A and the device DV-B is short, the robot MB can be present only at either of the nodes ND when the size of the robot MB is considered. When route planning is performed in such a graph MP, since only a conflict in units of nodes ND is considered in the conventional method, it is permitted that separate robots MB are simultaneously present in the node ND in front of the device DV-A and the node ND in front of the device DV-B.

In such a case, an object of the present disclosure is to make it possible to execute a route planning algorithm while reflecting the constraint that the robot MB can be present only at either of the node ND in front of the device DV-A and the node ND in front of the device DV-B.

2. Outline of a Route Search Method of the Present Disclosure

Figures 7, 8:
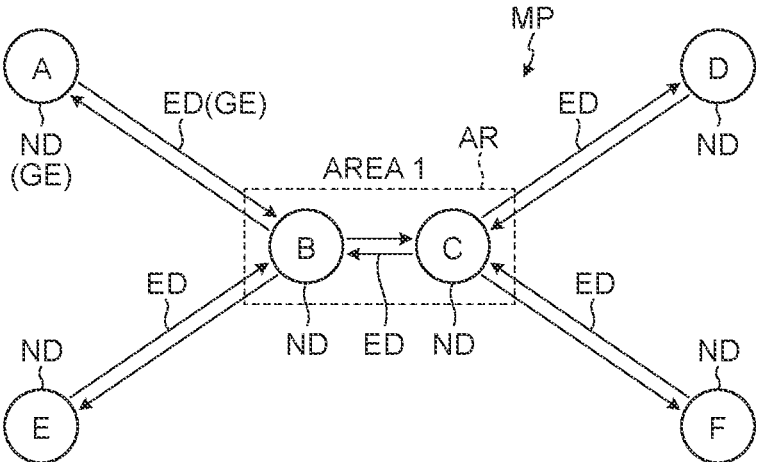
FIG. 7 is a diagram illustrating an outline of a route search method of the present disclosure.
FIG. 8 is a diagram illustrating an example of a graph data structure reflecting area setting.

FIG. 7 is a diagram illustrating an outline of a route search method of the present disclosure.

In the route search method of the present disclosure, a conflict of the route RT is detected across a plurality of graph elements GE. The route search method of the present disclosure includes the following three points.

(Point 1) Group a plurality of graph elements GE (hereinafter, the plurality of grouped graph elements GE are referred to as an "area").

(Point 2) Set a capacity of each area AR.

(Point 3) Perform route planning in consideration of the setting of the area AR.

First, a method of grouping the graph elements GE will be described. The grouping (area AR) has the following features.

(Feature 1) Each grouped graph element GE belongs to the area AR.

(Feature 2) The individual graph elements GE may belong to a plurality of areas AR, or may not belong to any area AR.

(Feature 3) The node ND and the edge ED may be mixed in the same area AR.

(Feature 4) The area AR has a numerical value of capacity. The capacity represents the number of robots MB that can simultaneously enter the area AR.

FIG. 8 is a diagram illustrating an example of a graph data structure reflecting area AR setting. Bold portions are items added due to area AR setting.

In the example of FIG. 8, a list of the areas AR set in the graph MP is represented by a field "areas". Each area AR has an ID ("id"), a capacity ("capacity"), a list of IDs of the nodes ND belonging to the area AR ("node_ids"), and a list of IDs of the edges ED belonging to the area AR ("edge_ids").

Each item of a list of the nodes ND (nodes) and a list of the edges ED (edges) includes a list of IDs of the areas AR to which the nodes ND and the edges ED belong, as "area_ids". However, "area_ids" is not mandatory. This is because "node_ids" and "edge_ids" in "areas" indicate all information about which node ND and edge ED belong to which area AR.

Figure 9:
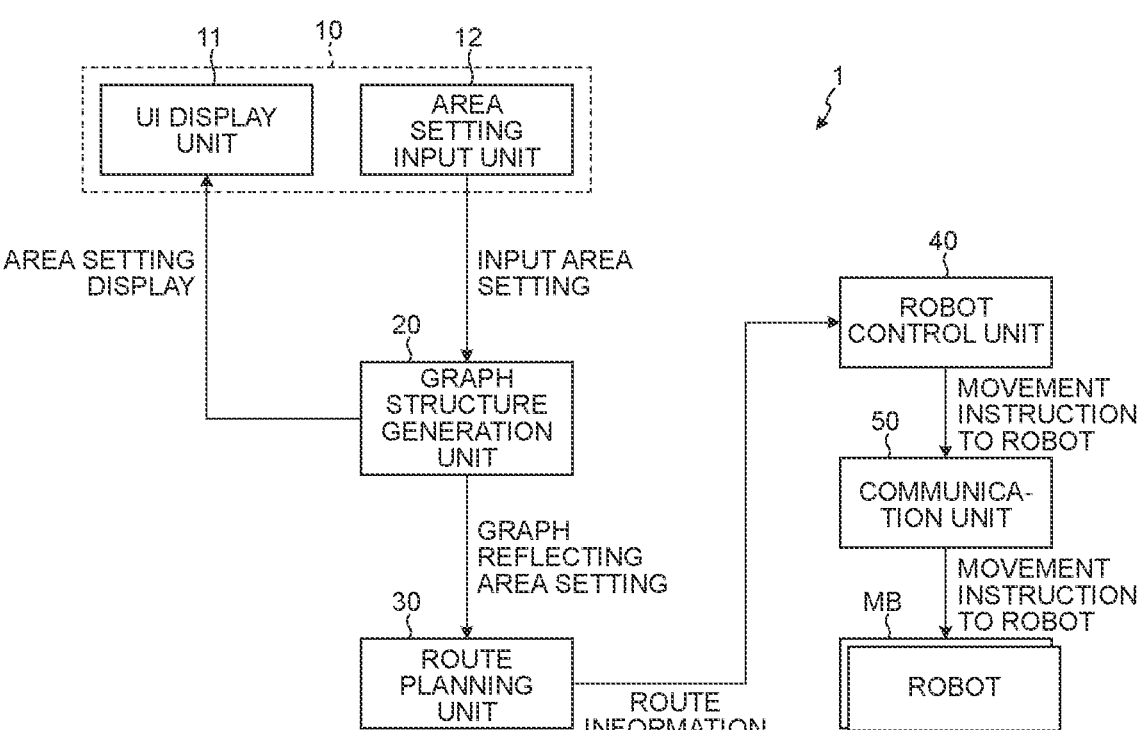
FIG. 9 is a diagram illustrating an example of a configuration of an information processing apparatus.

Route search using the graph data structure described above is implemented by an information processing apparatus 1 as illustrated in FIG. 9.

3. Configuration of the Information Processing Apparatus

FIG. 9 is a diagram illustrating an example of a configuration of the information processing apparatus 1.

The information processing apparatus 1 includes an area setting unit 10, a graph structure generation unit 20, a route planning unit 30, a robot control unit 40, and a communication unit 50.

The area setting unit 10 presents a user interface (UI) that visually performs area setting on the graph MP. Information regarding the number and arrangement of graph elements GE is supplied from the graph structure generation unit 20. The area setting unit 10 sets the area AR based on user input information input via the UI.

For example, the area setting unit 10 includes a UI display unit 11 and an area setting input unit 12. The UI display unit 11 displays a UI for performing area setting on a display DP (see FIG. 22). The user inputs information regarding the area AR using the UI. The area setting input unit 12 acquires information on the area AR input via the UI as the user input information.

The graph structure generation unit 20 sets the area AR in the graph MP based on the user input information. The area AR includes a plurality of graph elements GE. A capacity is set for each area AR and each graph element GE. The capacity indicates the number of robots MB allowed to be present simultaneously. The graph structure generation unit 20 sets the capacity of each area AR based on the user input information. The graph structure generation unit 20 sets the capacity of all the graph elements GE included in the graph MP to, for example, 1. The graph structure generation unit 20 generates a graph MP reflecting the area AR and the capacity information, and supplies the graph MP to the route planning unit 30.

The route planning unit 30 acquires information on the area AR and the capacity from the graph MP. The route planning unit 30 plans the route RT of the plurality of robots MB in the graph MP such that a conflict of the robots MB exceeding the capacity of the area AR does not occur in the area AR.

For example, the route planning unit 30 first obtains the shortest route of each robot MB without considering a conflict in the area AR, the node ND, and the edge ED. The search for the shortest route is performed using a known method such as A*. If a conflict occurs in any one of the area AR, the node ND, and the edge ED in the calculated shortest route of each robot MB, the route planning unit 30 obtains the shortest route of each robot MB again using the part where the conflict has occurred as a constraint. By repeating this, the route planning unit 30 searches for a set of routes RT along which no conflict occurs.

The route planning unit 30 generates route information of each robot MB based on the finally obtained route RT of each robot MB. The route information includes information regarding a movement destination and a movement time (movement timing) of the robot MB. The route planning unit 30 supplies the route information of each robot MB to the robot control unit 40.

The robot control unit 40 generates a movement instruction of each robot MB based on the route information of each robot. The movement instruction includes information regarding a movement destination and a movement time (movement timing) of the robot MB. The robot control unit 40 transmits a movement instruction of each robot MB to each robot MB via the communication unit 50.

4. Conflict Detection/Route Planning

FIGS. 10 to 13 are diagrams explaining a route planning method in consideration of area setting.

Route planning that is a set of "the edge ED through which the robot MB passes or the node ND at which the robot MB waits+time" in the conventional method is converted into a set of "the area AR through or in which the robot MB passes or waits+time" in the present disclosure. Hereinafter, an example of the conversion into "the area AR through or in which the robot MB passes or waits+time" will be described.

Figures 10, 11:
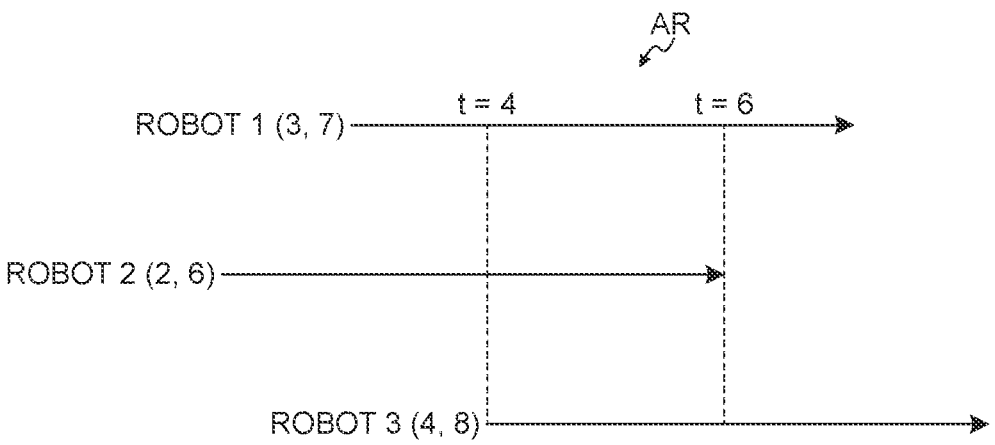
FIG. 10 is a diagram explaining a route planning method in consideration of area setting.
FIG. 11 is a diagram explaining the route planning method in consideration of area setting.

In the example of FIG. 10, conversion into "the area AR+time" is performed based on the information on the area AR to which the node ND and the edge ED belong. The robot MB-1 reaches a node B at time "4", waits for 1 second, then moves from an edge B to an edge C, and leaves a node C at time "7".

Since the node B, the edge B-C, and the node C belong to the same area AR, the stay time (period) in the area AR is (4, 7). Similarly, the stay time of the robot MB-2 in the area AR can be converted into (3, 5). After the area conversion, it is checked whether the stay times overlap in the same area AR. In the example of FIG. 10, it is considered that the robot MB-1 and the robot MB-2 is in a conflict in the area AR at time (4, 5). Therefore, it is necessary to search for another route RT.

The above is an example of conflict detection where the capacity of the area AR is 1. If the capacity is generalized, it is determined that a conflict occurs when the number of robots MB whose stay times overlap in the same area AR exceeds the capacity of the area AR. It is permitted that the robots MB are present simultaneously in the same area AR up to the number indicated in the capacity.

FIG. 11 illustrates an example in which the capacity of the area AR is 2. In the example of FIG. 11, the stay times of three robots MB overlap in the section of time (4, 6). Since more robots MB than the capacity enter the same area AR, it is determined that a conflict occurs.

Figures 12, 13:
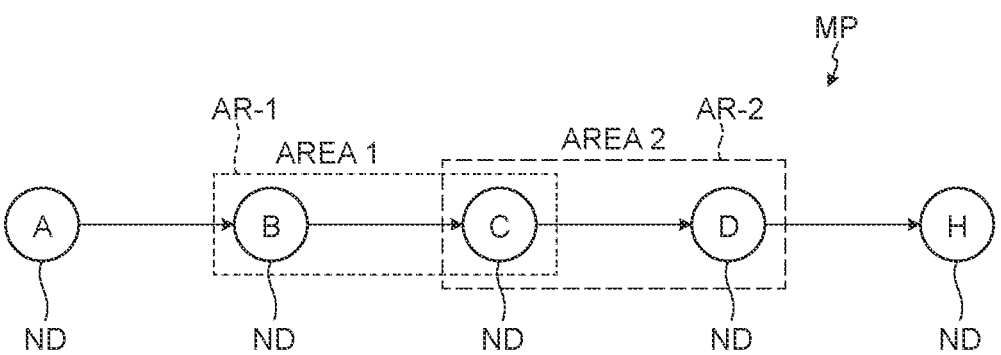
FIG. 12 is a diagram explaining the route planning method in consideration of area setting.
FIG. 13 is a diagram explaining the route planning method in consideration of area setting.

FIG. 12 illustrates an example in which one node ND belongs to a plurality of areas AR (area AR-1, area AR-2). Even in such a case, as illustrated in FIG. 13, the stay time of the node ND can be converted into the stay times of the area AR-1 and the area AR-2 by using the information on the area AR to which the node ND belongs.

In the route planning algorithm, in addition to the conventional conflict detection in units of graph elements GE, the above-described conflict detection in units of area AR is performed. If a conflict is detected in any of the node ND, the edge ED, and the area AR, a solution in which area setting is considered (a set of route planning without a conflict at any node ND, edge ED, and area AR) can be obtained by searching for another route.

Figure 14:
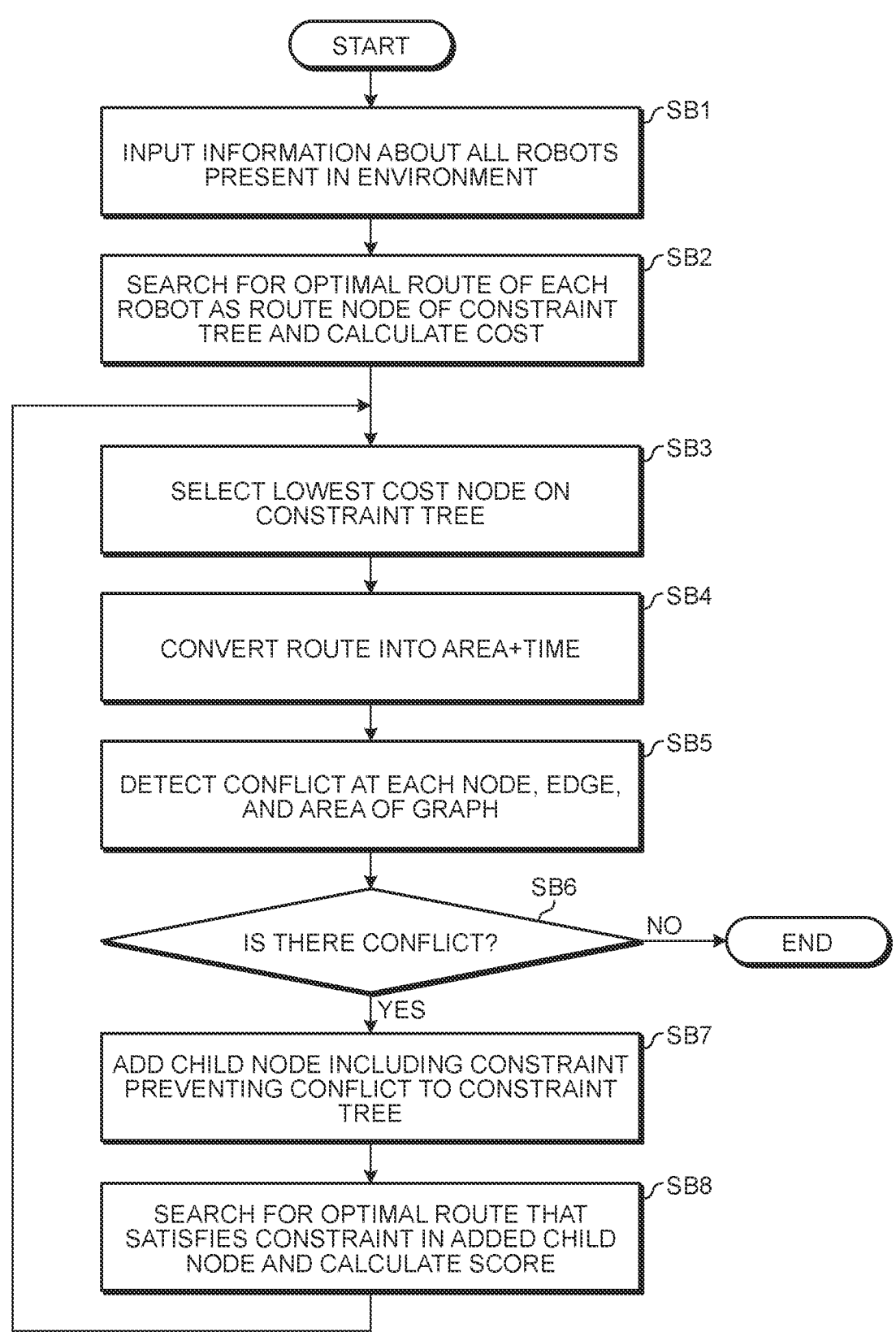
FIG. 14 is a flowchart of route search applying an area concept to the CBS.

FIG. 14 is a flowchart of route search applying the concept of the area AR to the CBS.

A difference from the conventional route search illustrated in FIG. 5 is that the stay time in the area AR is calculated from the stay times of the node ND and the edge ED, and conflict detection in the area AR is performed in addition to conflict detection in the node ND and the edge ED (Steps SB4 to SB5). Steps SB1 to SB3 and SB6 to SB8 are the same as Steps SA1 to SA3 and SA5 to SA7 illustrated in FIG. 5. In the example of FIG. 14, the concept of the area AR is applied to the CBS, but the algorithm to which the concept of the area AR can be applied is not limited to the CBS. Since algorithms other than the CBS also basically have conflict detection processing, the method of the present disclosure can be applied.

5. Specific Example of Area Setting

Figure 15:
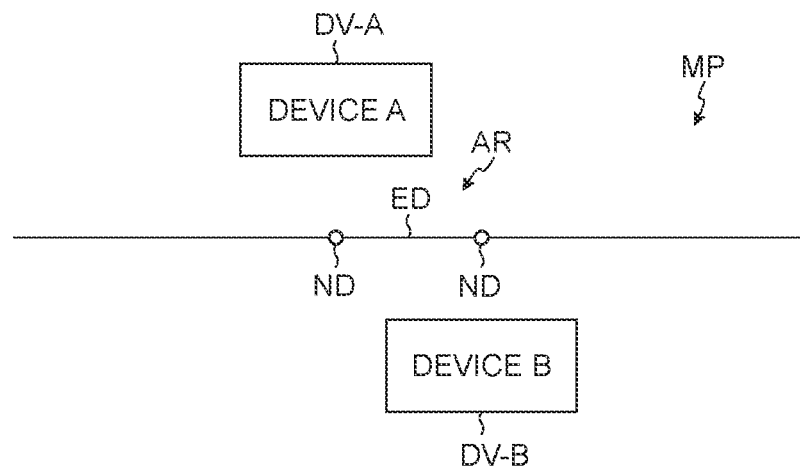
FIG. 15 is a diagram illustrating a specific example of area setting.
Figure 16:
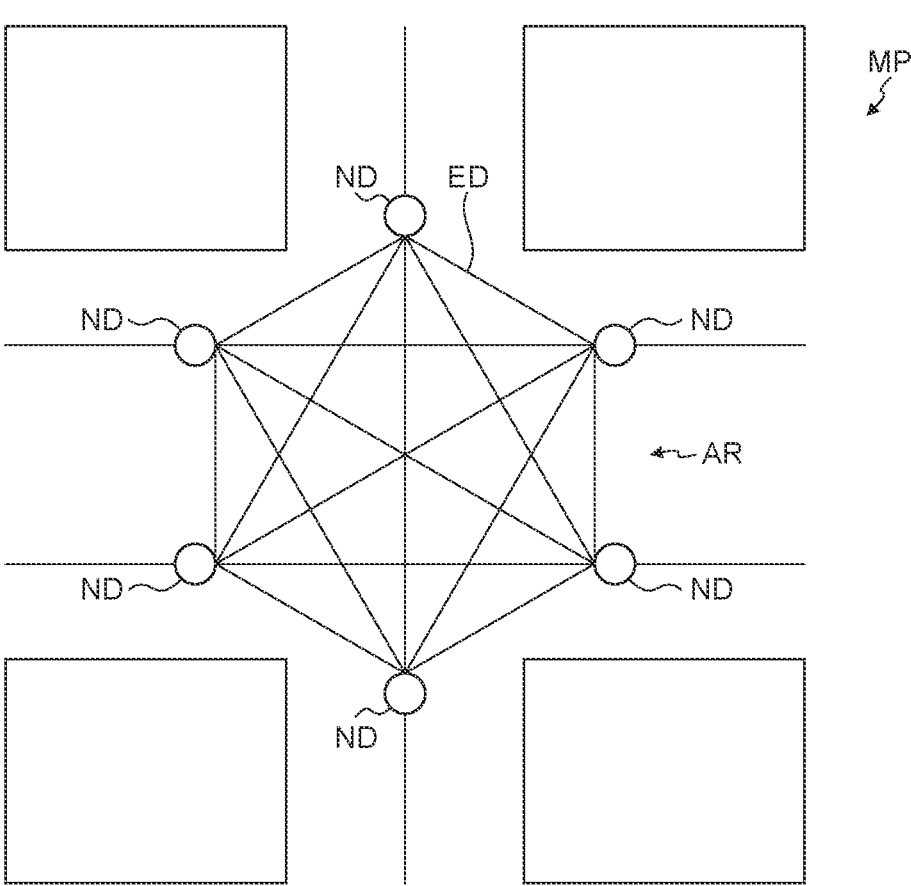
FIG. 16 is a diagram illustrating a specific example of area setting.

FIGS. 15 and 16 are diagrams illustrating a specific example of area setting.

In the example of FIG. 15, two nodes ND close to each other and an edge ED between the nodes ND are set as one area AR. The capacity of the area AR is 1. This is effective when the distance between the nodes ND is shorter related to the size of the robot MB. Performing such setting suppresses physical interference between the robots MB.

In the example of FIG. 16, all the edges ED inside the intersection are set as one area AR. The capacity of the area AR is 1. Performing such setting suppresses physical interference between the robots MB at the intersection. Note that what is desired to be controlled is the number of robots MB entering the intersection, and a plurality of robots MB may simultaneously wait at each node ND of the intersection.

6. Parent and Child Area Setting

Figure 17:
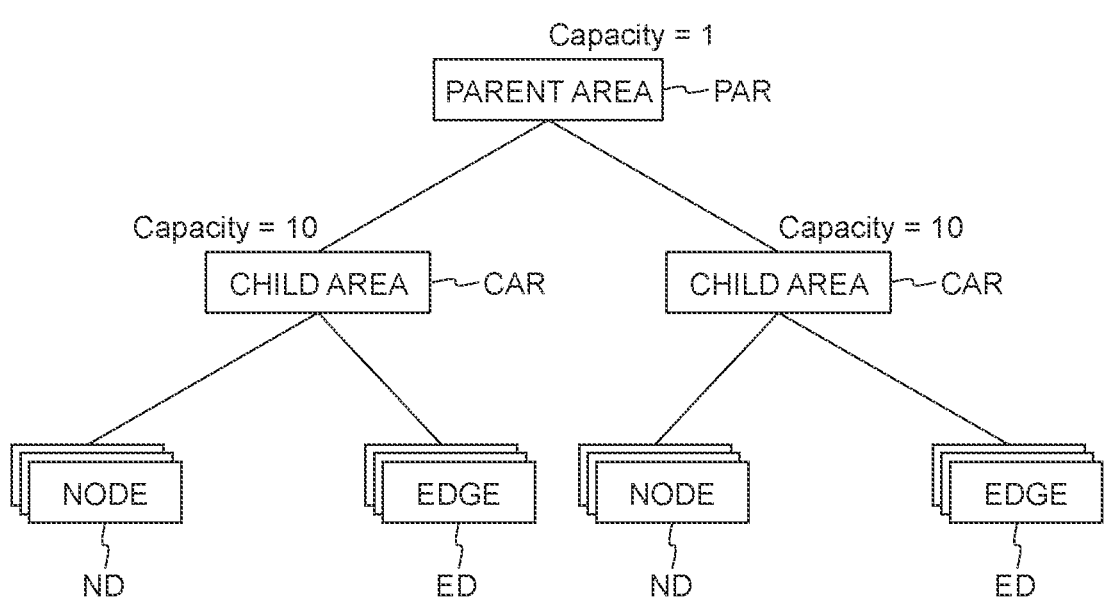
FIG. 17 is a diagram explaining parent and child area setting, which is an extension of area setting.

FIG. 17 is a diagram describing parent and child area setting, which is an extension of area setting.

The purpose of the parent and child area setting is to realize route planning with more advanced constraints that cannot be achieved by the normal area setting described above. The parent and child area setting has the following features.

(Feature 1) One or more child areas CAR belong to a parent area PAR.

(Feature 2) One or more graph elements GE belong to the child area CAR.

(Feature 3) Each of the parent area PAR and the child area CAR has a capacity.

(Feature 4) The number of child areas CAR in which one or more robots MB stay cannot exceed the capacity of the parent area PAR.

(Feature 5) The capacity of the child area CAR is independent of the capacity of the parent area PAR, and up to the capacity number of robot MBs can simultaneously enter each child area CAR.

The child area CAR is equivalent to the normal area AR described above. The graph structure generation unit 20 sets in the graph MP the parent area PAR including a plurality of areas AR each serving as the child area CAR. The route planning unit 30 plans the routes RT of the plurality of robots MB such that the number of child areas CAR in which one or more robots MB stay does not exceed the capacity of the parent area PAR.

If attention is paid to the parent area PAR, it is determined that there is a conflict when the number of child areas CAR in which one or more robots MB stay exceeds the capacity of the parent area PAR. For example, consider a case where the child area CAR-1 (capacity: 10) and the child area CAR-2 (capacity: 10) belong to the parent area PAR (capacity: 1). At this time, there is no conflict in a state where 10 robots MB simultaneously stay in the child area CAR-1 and no robot MB stays in the child area CAR-2. On the other hand, when one robot MB simultaneously stays in each of the child area CAR-1 and the child area CAR-2, it is determined that there is a conflict.

7. Specific Example of Parent and Child Area Setting

7-1. Setting of a Turn Prohibition Zone

Figure 18:
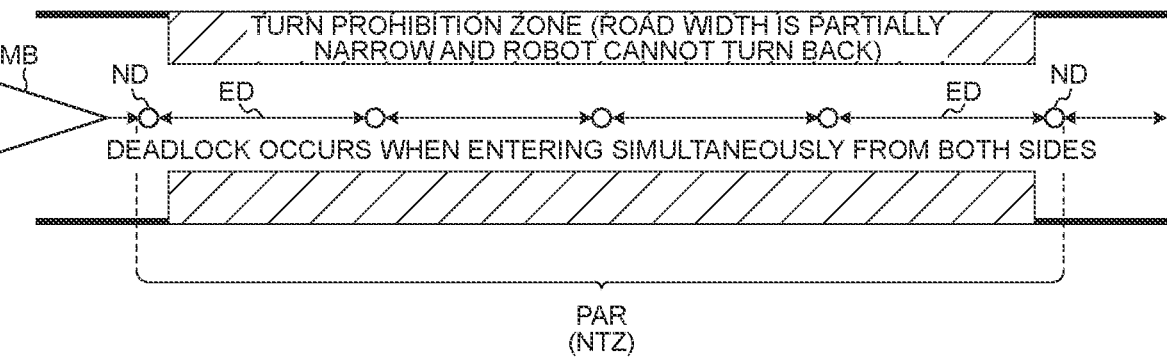
FIG. 18 is a diagram illustrating an example of setting a turn prohibition zone using parent and child areas.
Figure 19:
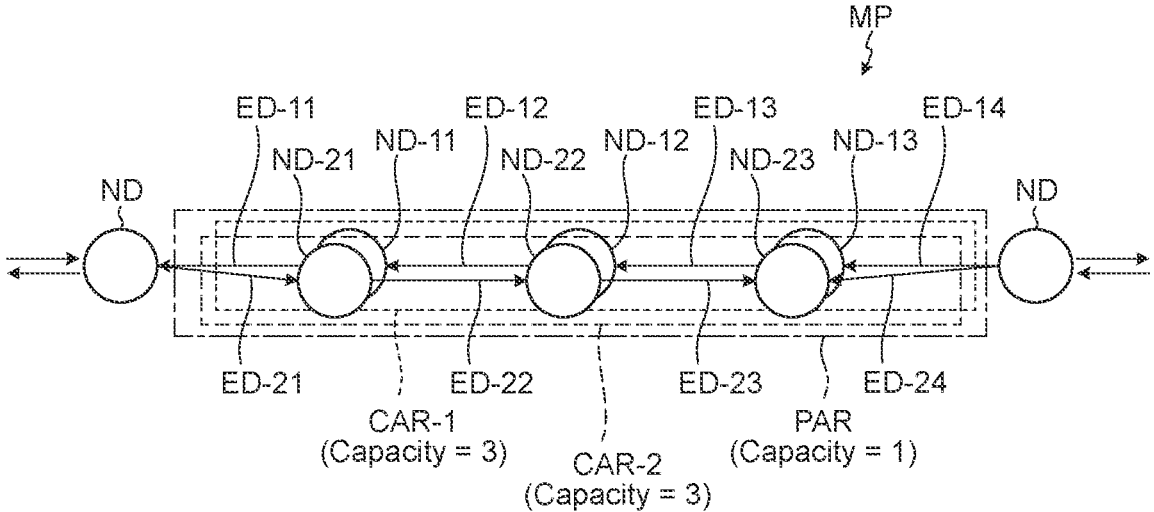
FIG. 19 is a diagram illustrating an example of setting the turn prohibition zone using the parent and child areas.

FIGS. 18 and 19 are diagrams illustrating an example of setting a turn prohibition zone NTZ using the parent and child areas.

The examples of FIGS. 18 and 19 assume a path where the road width is narrow and there is no sufficient space for the robot MB to turn. Since a deadlock occurs when the robots MB simultaneously enter such a path from both sides, it is necessary to perform route planning so as to prevent the deadlock. Although another method is to operate one-way traffic, the number of patterns of the route RT of the robot MB increases when the robot MB can travel from both sides, improving the movement efficiency.

In such an environment, the parent and child areas can be set as illustrated in FIG. 19 to impose the constraint that "the robots MB do not simultaneously enter from both sides" on the route planning algorithm. The graph MP of FIG. 19 is a directed graph, and the nodes ND and the edges ED are described separately for each traveling direction. The two nodes ND illustrated such that they partially overlap each other have the same coordinates, but their connected edges ED (traveling directions) are different from each other.

The nodes ND-11, ND-12, and ND-13 and the edges ED-11, ED-12, ED-13, and ED-14 are nodes ND and edges ED representing movement from right to left. The nodes ND-21, ND-22, and ND-23 and the edges ED-21, ED-22, ED-23, and ED-24 are nodes ND and edges ED representing movement from left to right. The graph structure generation unit 20 sets different child areas CAR for each traveling direction, and causes the child areas CAR to belong to the same parent area PAR. With this setting, a plurality of robots MB can simultaneously enter in only one direction up to the capacity of the child area CAR, but simultaneous entry from both sides is considered as a conflict.

7-2. Control of the Number of Robots Entering an Edge

Figure 20:
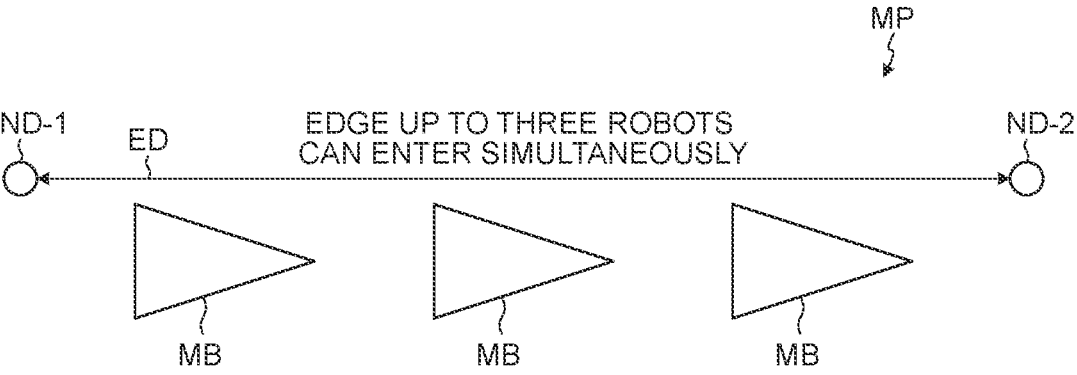
FIG. 20 is a diagram illustrating control of the number of robots entering an edge using the parent and child areas.
Figure 21:
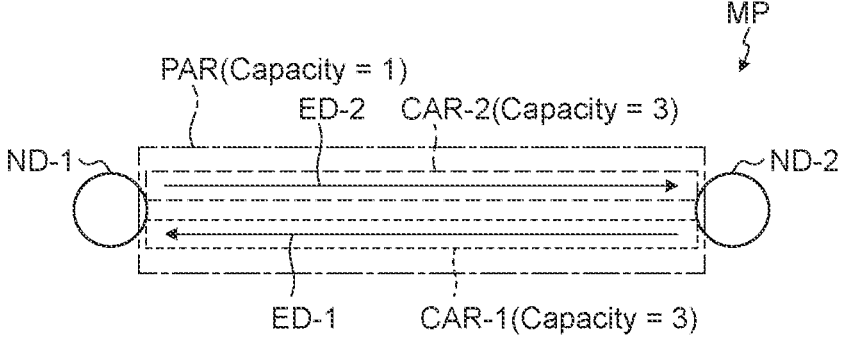
FIG. 21 is a diagram illustrating control of the number of robots entering an edge using the parent and child areas.

FIGS. 20 and 21 are diagrams illustrating control of the number of robots entering an edge ED using the parent and child areas.

In the conventional conflict detection in units of edges ED, it is determined that there is a conflict when a plurality of robots MB simultaneously enters the same edge ED. However, if the length of the edge ED is sufficiently longer than the size of the robot MB, it should be permitted that two or more robots MB simultaneously enter the same edge ED in the same direction. In this case, the graph structure generation unit 20 sets the capacity of one or more one-way edges ED selected based on the user input information among all the graph elements GE included in the graph MP, to two or more. The graph structure generation unit 20 sets the capacity of all the graph elements GE other than the one or more selected edges ED to one.

For example, consider an edge ED having a length that allows simultaneous entry of up to three robots MB as illustrated in FIG. 20. To permit the entry of the plurality of robots MB in the same direction, parent and child area setting may be performed as illustrated in FIG. 21.

The graph MP of FIG. 21 is a directed graph, and different child areas CAR are set for the edge ED representing the movement in each direction. The capacity of the child area CAR is set as the maximum number of robots MB that can simultaneously enter the edge ED. The graph structure generation unit 20 causes the child area CAR to belong to the same parent area PAR. With this setting, the route planning unit 30 does not perform the conventional conflict detection in units of edges on the edge ED the plurality of robots MB is permitted to enter.

8. User Interface

Figure 22:
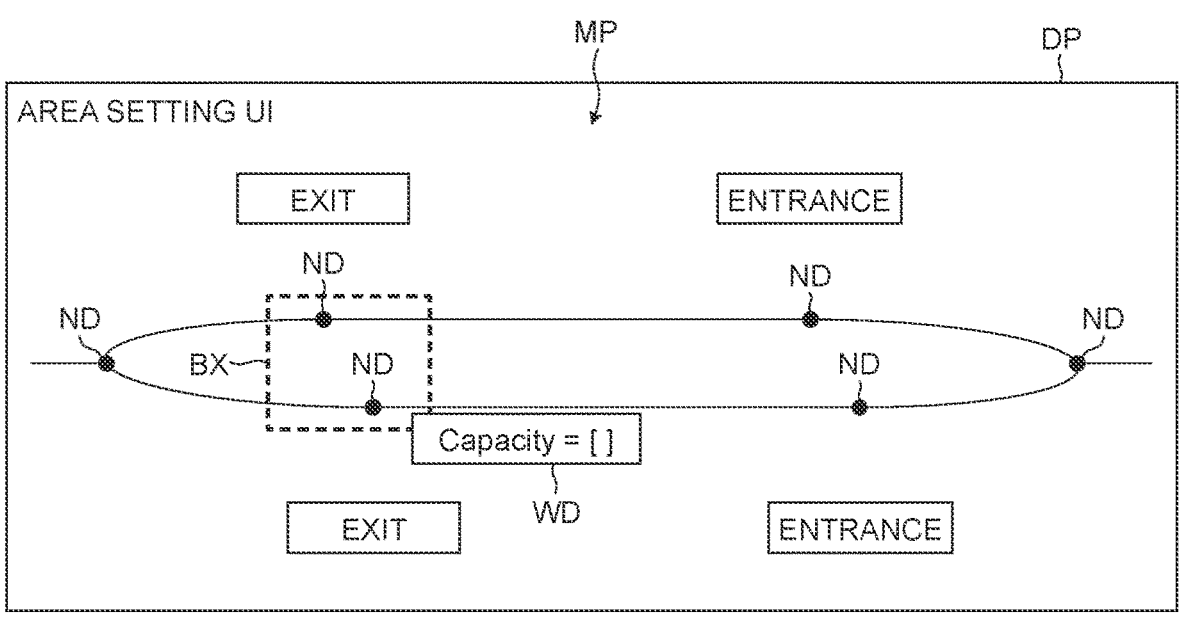
FIG. 22 is a diagram illustrating an example of a UI for performing area setting.

FIG. 22 is a diagram illustrating an example of a UI for performing area setting.

When performing area setting, a UI allowing visual selection of a plurality of nodes ND and edges ED is effective. The area setting unit 10 displays the graph MP on the display DP to allow one or more graph elements GE to be collectively selected by an operation on the UI. After the graph element GEs subject to area setting are selected, the capacity of the area AR can be set by a pop-up window or the like.

For example, the area setting unit 10 displays a selection tool BX for selecting a plurality of graph elements GE to be included in the same area AR. In response to the selection by the selection tool BX, the area setting unit 10 displays a window WD for setting the capacity of the area AR. Examples of the selection tool BX include a range selection tool such as a rectangle or a lasso (freehand figure) displayed by a mouse, a touch panel, or the like, and an individual selection tool that individually selects the target graph element GE by clicking (touching).

The UI may have a mode that collectively performs special area setting such as a turn prohibition zone setting mode in addition to normal area setting. For example, in the turn prohibition zone setting mode, parent and child area setting is automatically performed on the selected portion. In addition, the area AR set once may be selected again to change the capacity and add or delete the graph element GE included in the area AR.

FIGS. 23 to 26 are a diagram illustrating an example of the area AR.

When a plurality of areas AR are set in the graph MP, the area setting unit 10 displays the plurality of areas AR in an identifiable manner. Examples of a method of identifying the area AR include a method of displaying the graph element GE in different colors for each area AR, a method of surrounding each area AR with a line, and a method of performing both of them. The area name, the capacity, and the like may be displayed as the label TG.

Figure 23:
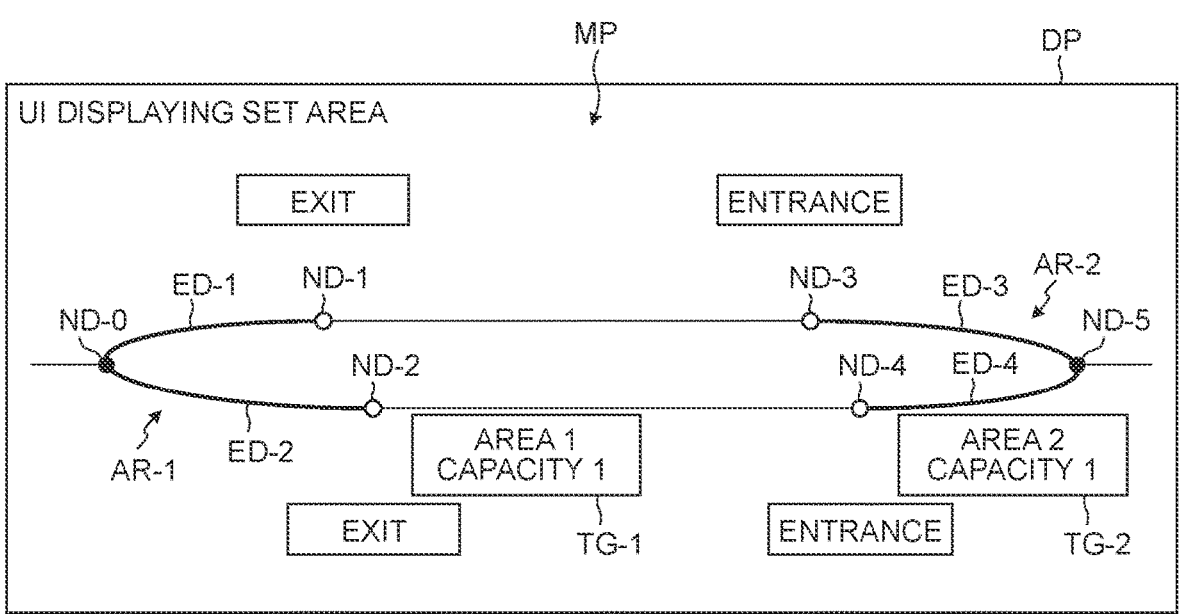
FIG. 23 is a diagram illustrating an example of area setting.
Figure 24:
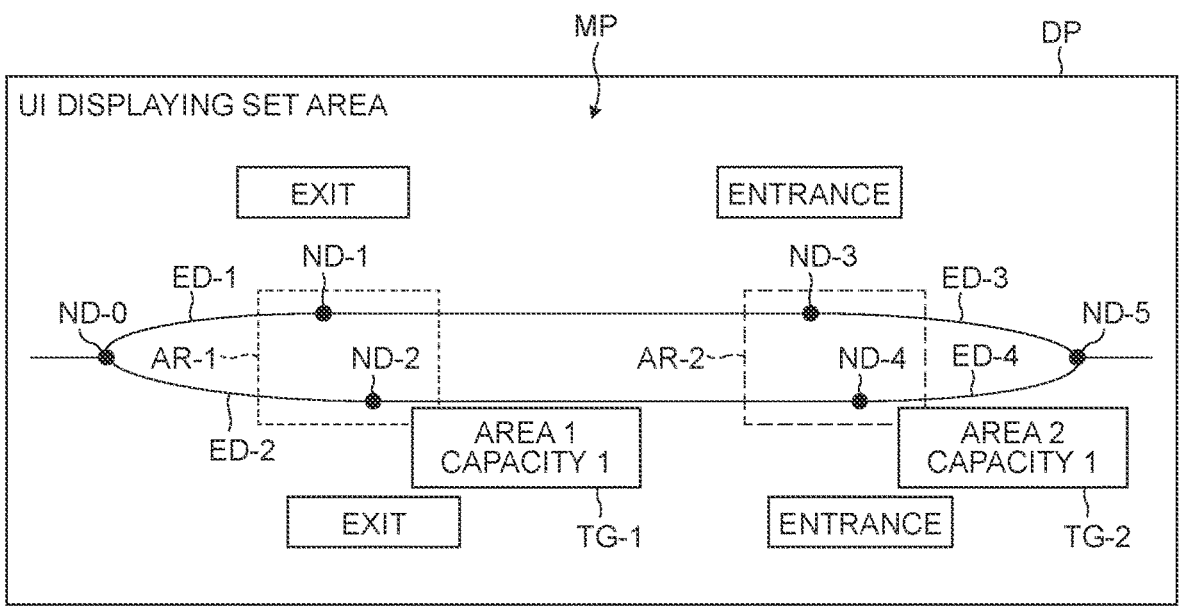
FIG. 24 is a diagram illustrating an example of area setting.

In the example of FIG. 23, the graph elements GE constituting the area AR-1 (node ND-1, node ND-2, edge ED-1, edge ED-2) and the graph elements GE constituting the area AR-2 (node ND-3, node ND-4, edge ED-3, edge ED-4) are drawn in different colors. A label TG-1 of the area AR-1 and a label TG-2 of the area AR-2 are also color-coded according to the color of the area. In the example of FIG. 24, the range of each area AR is indicated by a rectangular frame. The color of the frame is different for each area AR.

Figure 25:
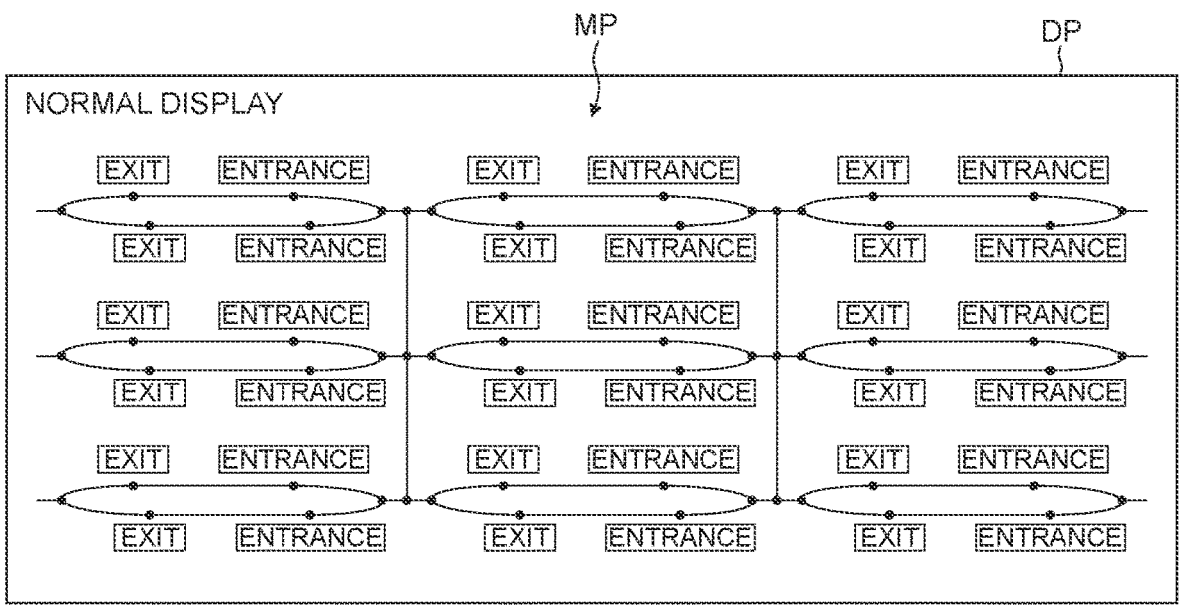
FIG. 25 is a diagram illustrating an example of area setting.
Figure 26:
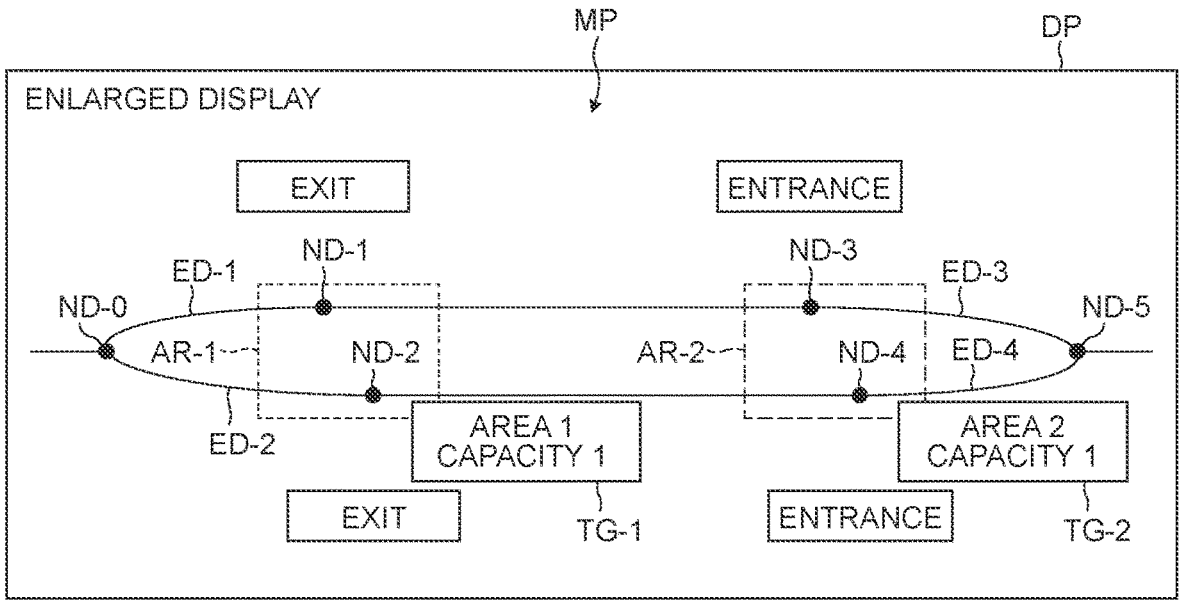
FIG. 26 is a diagram illustrating an example of area setting.

When the areas AR are finely set in the graph MP indicating a wide range as illustrated in FIG. 25, there is a problem that it is difficult to see the areas AR due to overlap of display or the like. Therefore, as illustrated in FIG. 26, there is a method in which the area setting is displayed on the UI only when the display is enlarged by mouse scrolling, pinch-in/pinch-out of a touch operation, or the like.

9. Application Example of a Route Search Method of the Present Disclosure

Figure 27:
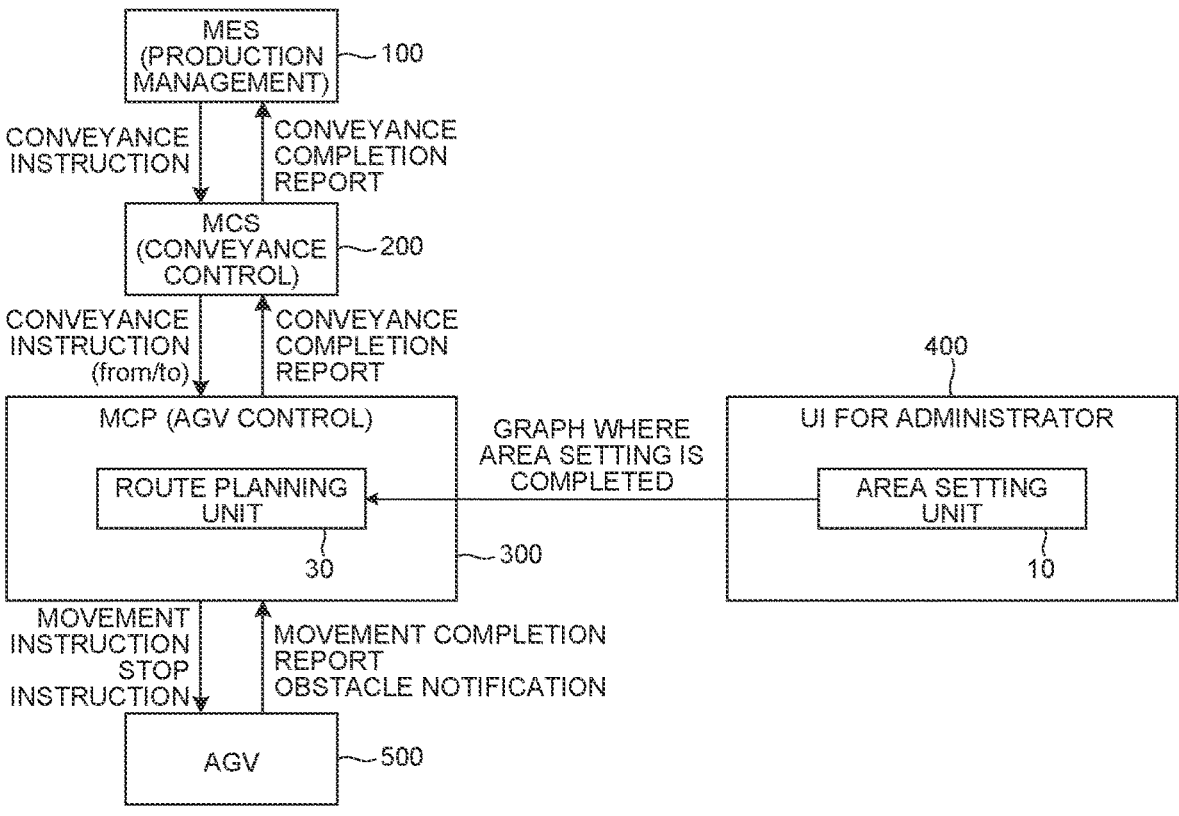
FIG. 27 is a diagram illustrating an example in which the route search method of the present disclosure is applied to an automatic conveyance system in a factory using an automatic conveyance vehicle.

FIG. 27 is a diagram illustrating an example in which the route search method of the present disclosure is applied to an automatic conveyance system in a factory using an automated guided vehicle (AGV).

The conveyance system includes a production management system (MES) 100, a conveyance control system (MCS) 200, an AGV control system (MCP) 300, and an AGV 500. The MES 100 issues a conveyance instruction to the MCS 200 based on the manufacturing process. The conveyance instruction here is, for example, "convey C from a device A to a device B." Based on the received conveyance instruction, the MCS 200 determines how to convey and which AGV 500 to be used, and further issues a conveyance instruction to the MCP 300. The conveyance instruction here is, for example, "convey C from a point A to a point B using the AGV (determined as the conveyance means)".

When receiving the conveyance instruction, the MCP 300 determines a specific movement route of the AGV 500. Here, a route planning system in consideration of area setting of the present disclosure is used. In addition, an administrator of the system can add, change, and delete area setting using a UI 400 for the administrator. For example, when the layout of the factory is changed, the administrator changes the area setting via the administrator UI 400. The route planning unit 30 can perform route planning by reflecting the changed area setting. In addition, the administrator can refer to the area AR set on the UI.

10. Example of a Hardware Configuration

Figure 28:
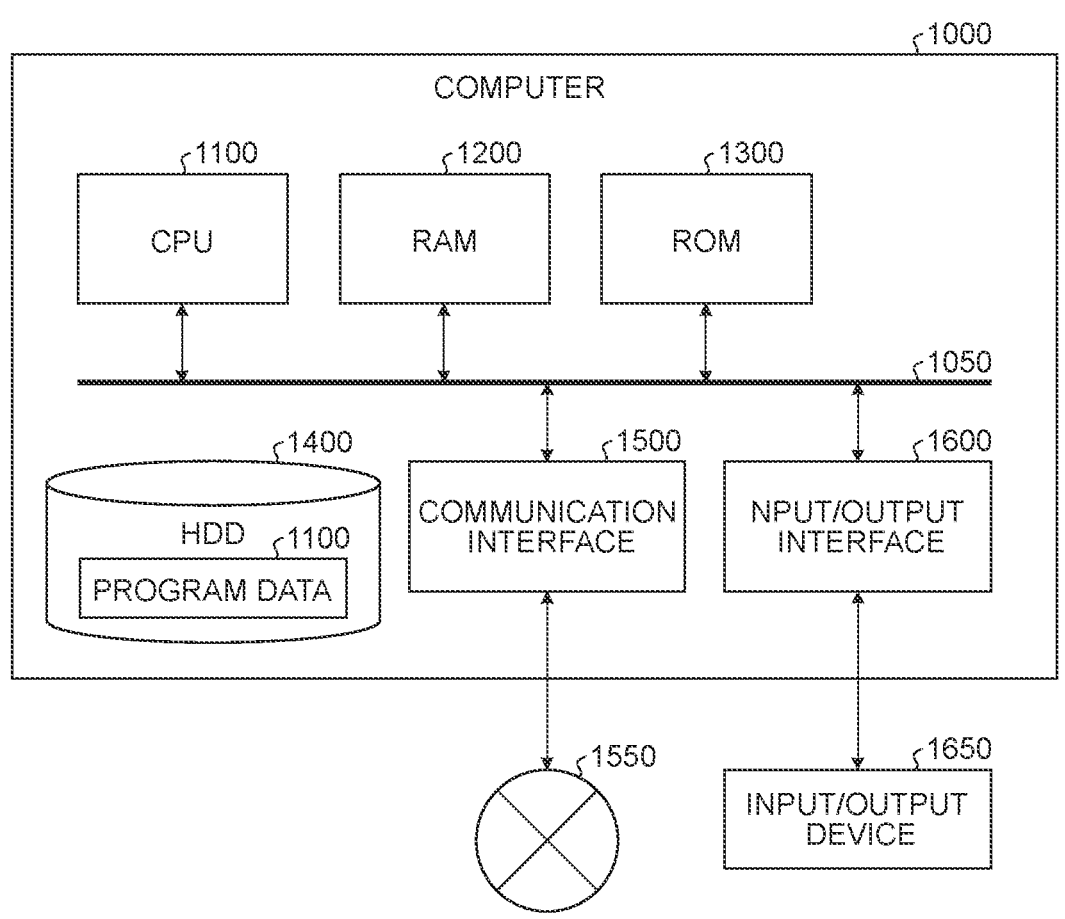
FIG. 28 is a diagram illustrating an example of a hardware configuration of an information processing apparatus.

FIG. 28 is a diagram illustrating an example of a hardware configuration of the information processing apparatus 1. For example, the information processing apparatus 1 is realized by a computer 1000. The computer 1000 includes a CPU 1100, a RAM 1200, a read only memory (ROM) 1300, a hard disk drive (HDD) 1400, a communication interface 1500, and an input/output interface 1600. The units of the computer 1000 are connected to each other by a bus 1050.

The CPU 1100 operates based on a program stored in the ROM 1300 or the HDD 1400, and controls each unit. For example, the CPU 1100 deploys the program stored in the ROM 1300 or the HDD 1400 to the RAM 1200, and executes processing corresponding to various programs.

The ROM 1300 stores a boot program such as a basic input output system (BIOS) executed by the CPU 1100 when the computer 1000 starts up, a program dependent on hardware of the computer 1000, and the like.

The HDD 1400 is a computer-readable recording medium that non-transiently records a program executed by the CPU 1100, data used by the program (including various databases), and the like. Specifically, the HDD 1400 is a recording medium that records an information processing program according to the present disclosure serving as an example of program data 1450.

The communication interface 1500 is an interface for the computer 1000 to connect to an external network 1550 (for example, the Internet). For example, the CPU 1100 receives data from another device or transmits data generated by the CPU 1100 to the other device via the communication interface 1500.

The input/output interface 1600 is an interface for connecting an input/output device 1650 and the computer 1000. For example, the CPU 1100 receives data from an input device such as a keyboard and a mouse via the input/output interface 1600. In addition, the CPU 1100 transmits data to an output device such as a display, a speaker, or a printer via the input/output interface 1600. Furthermore, the input/output interface 1600 may function as a media interface that reads a program or the like recorded in a predetermined recording medium (medium). The medium is, for example, an optical recording medium such as a digital versatile disc (DVD) or a phase change rewritable disk (PD), a magneto-optical recording medium such as a magneto-optical disk (MO), a tape medium, a magnetic recording medium, a semiconductor memory, or the like.

For example, when the computer 1000 functions as the information processing apparatus 1, the CPU 1100 of the computer 1000 implements the above-described various functions by executing a program loaded on the RAM 1200. In addition, the HDD 1400 stores a program for causing the computer to function as the information processing apparatus 1. The CPU 1100 reads the program data 1450 from the HDD 1400 and executes the program data, but as another example, these programs may be acquired from another device via the external network 1550.

11. Effects

The information processing apparatus 1 includes the graph structure generation unit 20 and the route planning unit 30. The graph structure generation unit 20 sets the area AR including a plurality of graph elements GE in the graph MP including the node ND and the edge ED as the graph elements GE. The route planning unit 30 plans the route RT of the plurality of robots MB in the graph MP such that a conflict of the robots MB exceeding the capacity of the area AR does not occur in the area AR. In the information processing method of the present disclosure, the processing of the information processing apparatus 1 is executed by the computer 1000. The program of the present disclosure causes the computer 1000 to implement the processing of the information processing apparatus 1.

According to this configuration, a conflict across the plurality of graph elements GE is detected based on the capacity of the area AR.

The graph structure generation unit 20 sets in the graph MP the parent area PAR including a plurality of areas AR each serving as the child area CAR. The route planning unit 30 plans the routes RT of the plurality of robots MB such that the number of child areas CAR in which one or more robots MB stay does not exceed the capacity of the parent area PAR.

According to this configuration, a complicated constraint can be imposed on route planning.

The graph structure generation unit 20 sets the capacity of all the graph elements GE included in the graph MP to one.

According to this configuration, it is possible to perform route planning based on a known algorithm such as CBS.

The graph structure generation unit 20 sets the capacity of one or more one-way edges ED selected based on the user input information among all the graph elements GE included in the graph MP, to two or more. The graph structure generation unit 20 sets the capacity of all the graph elements GE other than the one or more selected edges ED to one.

According to this configuration, the capacity of the specific edge ED increases, so that the number of routes that can be planned increases. This increases the degree of freedom of route planning.

The information processing apparatus 1 includes the area setting unit 10. The area setting unit 10 presents a UI that visually performs area setting on the graph MP.

According to this configuration, area setting can be easily performed.

For example, the area setting unit 10 displays the selection tool BX for selecting a plurality of graph elements GE to be included in the same area AR.

According to this configuration, the area AR is easily identified by selecting the graph elements GE.

In response to the selection by the selection tool BX, the area setting unit 10 displays a window WD for setting the capacity of the area AR.

According to this configuration, area AR identification and capacity setting are performed integrally.

The area setting unit 10 displays a plurality of areas AR in an identifiable manner.

According to this configuration, the area AR can be easily identified.

Note that the effects described herein are merely examples and are not subject to limitations, and other effects may be provided.

Supplementary Notes

The present technique may also have the following configurations.

(1)

An information processing apparatus comprising:

a graph structure generation unit that sets an area including a plurality of graph elements in a graph including a node and an edge as a graph element; and a route planning unit that plans routes of a plurality of moving bodies in the graph such that a conflict of the moving bodies exceeding a capacity of the area does not occur in the area.

(2)

The information processing apparatus according to (1), wherein the graph structure generation unit sets in the graph a parent area including a plurality of areas each serving as a child area, and the route planning unit plans routes of the plurality of moving bodies such that the number of child areas in which one or more moving bodies stay does not exceed a capacity of the parent area.

(3)

The information processing apparatus according to (1) or (2), wherein the graph structure generation unit sets a capacity of all graph elements included in the graph to one.

(4)

The information processing apparatus according to (1) or (2), wherein the graph structure generation unit sets a capacity of one or more one-way edges selected based on user input information among all graph elements included in the graph, to two or more, and sets a capacity of all graph elements other than the one or more selected edges to one.

(5)

The information processing apparatus according to any one of (1) to (4), comprising an area setting unit that presents a UI visually performing area setting on the graph.

(6)

The information processing apparatus according to (5), wherein the area setting unit displays a selection tool for selecting the plurality of graph elements to be included in the same area.

(7)

The information processing apparatus according to (6), wherein in response to selection by the selection tool, the area setting unit displays a window for setting the capacity of the area.

(8)

The information processing apparatus according to any one of (5) to (7), wherein the area setting unit displays a plurality of areas in an identifiable manner.

(9)

An information processing method executed by a computer, the method comprising:

setting an area including a plurality of graph elements in a graph including a node and an edge as a graph element; and planning routes of a plurality of moving bodies in the graph such that a conflict of the moving bodies exceeding a capacity of the area does not occur in the area.

(10)

A program for causing a computer to implement:

setting an area including a plurality of graph elements in a graph including a node and an edge as a graph element; and planning routes of a plurality of moving bodies in the graph such that a conflict of the moving bodies exceeding a capacity of the area does not occur in the area.

REFERENCE SIGNS LIST

1 INFORMATION PROCESSING APPARATUS
10 AREA SETTING UNIT
20 GRAPH STRUCTURE GENERATION UNIT
  30 ROUTE PLANNING UNIT
AR AREA
BX SELECTION TOOL
CAR CHILD AREA
ED EDGE
GE GRAPH ELEMENT
MB ROBOT (MOVING BODY)
MP GRAPH
ND NODE
PAR PARENT AREA
RT ROUTE
WD WINDOW

The invention claimed is:

1. An information processing apparatus, comprising:
an output device; and
a central processing unit (CPU) configured to:
  control the output device to display a user interface (UI) having a graph;
  perform an area setting process on the graph to set a first area in the graph, wherein
    the set first area includes a first plurality of graph elements of a set of graph elements,
    the graph includes a plurality of nodes and a plurality of edges, and
    each of the plurality of nodes and each of the plurality of edges corresponds to a respective graph element of the set of graph elements; and
  plan a plurality of routes of a plurality of moving bodies in the graph to avoid a first conflict in the set first area,
  wherein
    the first conflict indicates that a first number of moving bodies of the plurality of moving bodies simultaneously present in the set first area exceeds a first capacity of the set first area, and the first capacity of the set first area indicates a second number of moving bodies, of the plurality of moving bodies, simultaneously allowable in the set first area.

2. The information processing apparatus according to claim 1, wherein the CPU is further configured to:
set in the graph a parent area including a plurality of child areas; and
the plurality of routes of the plurality of moving bodies to avoid a second conflict in the parent area, wherein
  each of a set of child areas of the plurality of child areas includes at least one first respective moving body of the plurality of moving bodies,
  the set of child areas includes a first number of child areas,
  the second conflict indicates that the first number of child areas simultaneously including the at least one the first respective moving body exceeds a second capacity of the parent area, and
  the second capacity of the parent area indicates a second number of child area, of the plurality of child areas, simultaneously allowable to include at least one second respective moving body of the plurality of moving bodies.

3. The information processing apparatus according to claim 1, wherein the CPU is further configured to set a third capacity of each of the set of graph elements to one.

4. The information processing apparatus according to claim 1, wherein the CPU is further configured to:
select at least one-way edge from the plurality of edges based on user input information, wherein the selected at least one-way edge corresponds to a second plurality of graph elements of the set of graph elements;
set a fourth capacity of the second plurality of graph elements to at least two; and
set a fifth capacity of each of the set of graph elements, except for the fourth capacity of the second plurality of graph elements, to one.

5. The information processing apparatus according to claim 1, wherein the output device is configured to:
display a selection tool to select the first plurality of graph elements; and
display of the selection tool to include the selected first plurality of graph elements in the set first area.

6. The information processing apparatus according to claim 5, wherein, based on the selection, the output device is further configured to display a window to set the first capacity of the set first area.

7. The information processing apparatus according to claim 1, wherein
the output device is further configured to display a plurality of areas in an identifiable manner, and
the plurality of areas includes the set first area.

8. An information processing method executed by a computer, the method comprising:
controlling an output device to display a user interface (UI) having a graph;
performing an area setting process on the graph for setting an area in the graph, wherein
  the set area includes a plurality of graph elements of a set of graph elements,
  the graph includes a plurality of nodes and a plurality of edges, and
  each of the plurality of nodes and each of the plurality of edges corresponds to a respective graph element of the set of graph elements; and

planning a plurality of routes of a plurality of moving bodies in the graph to avoid a conflict in the set area, wherein the conflict indicates that a first number of moving bodies of the plurality of moving bodies simultaneously present in the set area exceeds a capacity of the set area, and the capacity of the set area indicates a second number of moving bodies, of the plurality of moving bodies, simultaneously allowable in the set area.

9. A non-transitory computer-readable medium having stored thereon, computer-executable instructions that when executed by a computer, causes the computer to execute operations, the operations comprising:

controlling an output device to display a user interface (UI) having a graph;

performing an area setting process on the graph for setting an area in the graph, wherein

18 the set area includes a plurality of graph elements of a set of graph elements, the graph includes a plurality of nodes and a plurality of edges, and each of the plurality of nodes and each of the plurality of edges corresponds to a respective graph element of the set of graph elements; and planning a plurality of routes of a plurality of moving bodies in the graph to avoid a conflict in the set area, wherein the conflict indicates that a first number of moving bodies of the plurality of moving bodies simultaneously present in the set area exceeds a capacity of the set area, and the capacity of the set area indicates a second number of moving bodies of the plurality of moving bodies, simultaneously allowable in the set area.

\* \* \* \* \*